(12) United States Patent
Doerr et al.

(10) Patent No.: US 8,169,173 B2
(45) Date of Patent: May 1, 2012

(54) METHOD FOR CONTROLLING A VEHICLE DRIVE UNIT

(75) Inventors: Bernd Doerr, Wallduern (DE); Holger Niemann, Ludwigsburg (DE); Thorsten Juenemann, Sindelfingen (DE); Per Hagman, Alingsas (SE)

(73) Assignee: Robert Bosch GmbH, Stuttgart (DE)

( * ) Notice: Subject to any disclaimer, the term of this patent is extended or adjusted under 35 U.S.C. 154(b) by 804 days.

(21) Appl. No.: 12/064,978

(22) PCT Filed: Aug. 4, 2006

(86) PCT No.: PCT/EP2006/065065
§ 371 (c)(1),
(2), (4) Date: Oct. 2, 2008

(87) PCT Pub. No.: WO2007/025839
PCT Pub. Date: Mar. 8, 2007

(65) Prior Publication Data
US 2009/0160379 A1    Jun. 25, 2009

(30) Foreign Application Priority Data
Aug. 29, 2005  (DE) .......................... 10 2005 040 783

(51) Int. Cl.
*H02P 7/00* (2006.01)
(52) U.S. Cl. ..... 318/432; 318/434; 180/65.1; 180/65.21
(58) Field of Classification Search ............. 318/400.15, 318/400.23, 362, 375, 376, 400.06, 400.07, 318/400.03, 400.01, 445, 432, 434; 701/22, 701/84; 180/65.21, 65.28, 65.1
See application file for complete search history.

(56) References Cited

U.S. PATENT DOCUMENTS

| | | | |
|---|---|---|---|
| 6,064,934 A | 5/2000 | Zhang | |
| 6,076,500 A | 6/2000 | Clement et al. | |
| 6,285,946 B1 | 9/2001 | Steinmann | |
| 6,490,511 B1 | 12/2002 | Raftari et al. | |
| 6,574,535 B1* | 6/2003 | Morris et al. | 701/22 |
| 6,741,917 B2* | 5/2004 | Tomikawa | 701/22 |
| 6,964,192 B2 | 11/2005 | Bauer et al. | |
| 7,363,122 B2* | 4/2008 | Bischoff | 701/22 |
| 2002/0107617 A1* | 8/2002 | Tomikawa | 701/22 |

(Continued)

FOREIGN PATENT DOCUMENTS
DE    19739565    3/1999
(Continued)

OTHER PUBLICATIONS

International Search Report, PCT International Patent Application No. PCT/EP2006/065065, dated Dec. 15, 2006.

*Primary Examiner* — Bentsu Ro
*Assistant Examiner* — Antony M Paul
(74) *Attorney, Agent, or Firm* — Kenyon & Kenyon LLP

(57) ABSTRACT

A method for controlling a vehicle drive unit, the vehicle drive unit having at least two individual motors. A total actual torque is continuously compared with an allowable total torque, the total actual torque being calculated from individual actual torque values of the at least two individual motors, and the allowable total torque being calculated from the allowable individual torque values of the at least two individual motors, and an error response being initiated if the comparison establishes that the total actual torque is greater than the allowable total torque.

11 Claims, 1 Drawing Sheet

U.S. PATENT DOCUMENTS

| | | |
|---|---|---|
| 2004/0235613 A1 | 11/2004 | Aoki et al. |
| 2005/0060079 A1 | 3/2005 | Phillips et al. |
| 2005/0119805 A1* | 6/2005 | Bischoff .................. 701/22 |

FOREIGN PATENT DOCUMENTS

| | | |
|---|---|---|
| DE | 19748355 | 5/1999 |
| DE | 10155128 | 6/2002 |
| DE | 10202531 | 8/2003 |
| DE | 10210684 | 10/2003 |
| DE | 10320017 | 12/2004 |
| EP | 1522447 | 4/2005 |
| JP | 2000 1133 | 1/2000 |
| JP | 2003 219509 | 7/2003 |

* cited by examiner

METHOD FOR CONTROLLING A VEHICLE DRIVE UNIT

FIELD OF THE INVENTION

The present invention relates to a method for controlling a vehicle drive unit which includes at least two individual motors, in particular to a hybrid drive which includes at least one internal combustion engine and at least one electric motor.

BACKGROUND INFORMATION

German Patent Application No. DE 103 20 017 A1 describes control devices for a drive unit which control or regulate the drive unit in particular regarding a drive torque output, the drive unit being an internal combustion engine of a motor vehicle. In this case the motor vehicle normally includes a driver input sensing device operatable by the driver of the motor vehicle, in particular a foot-operatable accelerator pedal which is provided for outputting an output signal representing the instantaneous operating state of the driver input sensing device. A control unit receives the output signal of the driver input sensing device and assigns at least one setpoint output quantity, in particular a setpoint drive torque of the drive unit, to the received output signal. The drive unit is controlled by the control unit in such a way that an actual output quantity output by the drive unit approaches the setpoint output quantity. Such control devices are available in different designs for regular motor vehicle motors, in particular gasoline and diesel engines, for example, Bosch engine control systems having an electronic gas pedal (EGAS).

Furthermore, performing continuous torque monitoring for detecting malfunctions in the control unit is conventional. This is used, in particular, for protecting the vehicle occupants in the motor vehicle and external traffic participants. Unintended acceleration of the vehicle is to be prevented. The core of continuous torque monitoring is the comparison of an actual torque provided by the motor with an allowable torque. In the normal case, the actual torque is less than the allowable torque. If the actual torque exceeds the allowable torque, there is a malfunction in the engine control unit and an error response leading to a safe vehicle state is initiated.

The engine control units are normally monitored according to a three-level monitoring concept. The engine is actually controlled, in particular the setpoint torque is defined, on the first level known as the function level. The second level (monitoring level) is designed as continuous torque monitoring. On this level, an allowable torque is ascertained as a function of vehicle and engine functions, among other things, and compared with an actual engine torque. Level 2 is secured in a complex manner (double storage of all variables, cyclic RAM and ROM check, program sequence check, instruction test). Level 3 is used for securing the computer.

German Patent Application No. DE 102 10 684 A1 describes a method for monitoring a torque of a drive unit of a vehicle. The torque to be monitored is compared to an allowable torque; the allowable torque is adjusted to the torque to be monitored and a malfunction is detected if the torque to be monitored differs from the allowable torque by more than a first predefined value, the malfunction being detected only in the case where a position of an operating control element, in particular an accelerator pedal position, has been within a first predefined tolerance range at least since a first predefined point in time.

German Patent Application No. DE 197 39 565 A1 describes a method for controlling the torque of a drive unit of a motor vehicle in which the torque of the drive unit is set at least according to the driver's input, the actual torque of the drive unit being determined and a maximum allowable torque being ascertained at least on the basis of the driver's input. The torque is reduced and/or limited when the actual torque exceeds the maximum allowable torque. At least one operating state is established in which the torque of the drive unit is increased due to additional load. The maximum allowable torque is increased during this at least one operating state. In particular, the allowable torque is increased during operation with a cold drive unit and/or when operating high-load consumers.

German Patent Application No. DE 197 48 355 A1 describes a method for controlling the drive unit of a vehicle, the torque of the drive unit being predefined as a function of a driver's intended torque derived from the position of an operating control element operatable by the driver and as a function of a setpoint torque which is predefined from at least one external function which influences the toque instead of or in addition to the driver's input. A maximum allowable torque is predefined and, when this maximum allowable value is exceeded, the torque is reduced via the corresponding actual value. The maximum allowable torque is formed at least as a function of the position of the operating control element and the maximum allowable torque is formed as a function of the setpoint torque of the at least one external function if this setpoint torque is greater than the allowable torque which is a function of the position of the operating control element. The external function may increase the torque, for example, with respect to the driver's input as an engine-drag-torque control or a cruise control.

The above-described conventional torque monitoring methods are not applicable to hybrid vehicles in a straightforward manner. In hybrid vehicles, at least one additional torque source (motor) is used in addition to the internal combustion engine. In most cases this is an electric motor.

The intended torque requested by the driver, which is set, for example, by operating an accelerator pedal, must now be divided among the torque sources present (at least two motors) in the engine controller. This is performed as a function of a number of environmental variables, for example, with the purpose of setting the operating point which is the most favorable from the consumption point of view for all torque sources. Such a method is described in German Patent Application No. DE 102 02 531 A1, for example.

So far no conventional torque monitoring concept takes into account the special requirements of such a hybrid drive having one or more electric motors in addition to an internal combustion engine. An additional electric motor connected to the drive train may cause, in the event of an excessive control current, an undesirable vehicle acceleration just as a "simple" internal combustion engine and therefore requires continuous torque monitoring.

SUMMARY

An example method according to the present invention for controlling a vehicle drive unit avoids the disadvantages of the conventional method known. In particular, the example method according to the present invention makes it possible to detect and identify errors in the torque control of hybrid vehicles and thus to enhance the security of the overall system.

In accordance with the present invention, a torque comparison is performed between a total actual torque and a total allowable torque which include the individual torques of the at least two motors of the vehicle drive unit.

This advantageously provides a simple concept integrating the at least one additional torque generator, in particular an electric motor, into the existing concept of torque comparison. The additional torque is taken into account on both sides of the torque comparison. This provides a very simple and generally applicable treatment of the additional torques, for example, of an electric motor, for any vehicle configuration.

In the example method according to the present invention, the vehicle drive unit has at least two individual motors or torque sources. These may be one internal combustion engine, in particular a gasoline or diesel engine, and one electric motor or two electric motors. However, there may also be more motors, for example, more than two electric motors.

The total actual torque calculated according to the present invention is computed from the individual actual torque values of the at least two individual motors, in particular by adding up the individual actual torque values. The individual actual torque values of each individual motor are determined according to a preferred specific embodiment of the present invention by back-calculating motor variables. In the case of a gasoline engine, possible motor variables taken into account in this back-calculation include, for example, measured values of the air quantity, measured values of a lambda sensor, and/or measured ignition angles. In the case of a diesel engine, injection parameters such as fuel pressure, injector opening time, and/or injector closing time, for example, may be taken into account for the back-calculation. The back-calculation for an electric motor is performed, for example, by converting current, voltage, and/or rotational speed of the electric motor. The individual actual torque values of the at least two motors may, however, be also determined in the method according to the present invention by any other conventional method, for example, with the help of at least one torque sensor on a crankshaft.

The total allowable torque calculated according to the present invention is computed from the individual allowable torque values of the at least two individual motors, in particular by adding up the individual allowable torque values. According to a preferred specific embodiment of the present invention, the allowable individual torque values of each individual motor are determined by taking into account vehicle functions and/or motor functions which influence the torque control or regulation of the vehicle drive unit. For example, the vehicle functions to be taken into account in determining an allowable individual torque value include a driver's input function, a driver's assistance function, or external intervening functions. The driver's input function may be included in the determination of the allowable individual torque value in the form of an accelerator pedal signal, for example. Driver's assistance functions to be possibly taken into account include, for example, an electronic stability program (ESP—usually ABS+TCS), an antilock system (ABS), a traction control system (TCS), a cruise control system (CC), or an adaptive cruise control (ACC) system. External influencing functions to be possibly taken into account include, for example, interference from electrical consumers such as an AC unit, an electric sunroof, or a servomotor. Motor functions that affect the torque control or regulation of the vehicle drive unit and which may be taken into account in determining the allowable individual torque of the particular motor include, for example, a speed limitation or torque losses, in particular due to friction or generator losses.

These functions are taken into account in calculating the allowable torque on level 2 of the monitoring concept using redundant interpretations. Level 2 has functions that reflect the functions of level 1. Thus, for example, on level 1, the accelerator pedal is interpreted by forming a driver's input as a function of the accelerator pedal angle and the rotational speed. On level 2, there is an interpretation of the accelerator pedal which is redundant with respect to the previous one by also forming an accelerator pedal torque from the accelerator pedal angle of level 2 and the rotational speed of level 2. This redundancy is exactly the basis of the reliability due to the three-level reliability concept. All torque-relevant functions of level 1 need these redundant functions on level 2.

In the example method according to the present invention, an error response is initiated if the comparison of the total actual torque with the allowable total torque yields the result that the total actual torque is greater than the allowable total torque. The error response may be, for example, that a speed-limited operating mode of at least one motor or all of the motors included in the vehicle drive unit is initiated and/or a predefined setpoint torque is reduced for at least one of the motors. Furthermore, at least one of the at least two motors may be fully turned off, for example, by shutting off the fuel supply to an internal combustion engine.

The example method according to the present invention runs on level 2 (monitoring level) of a 3-level monitoring concept such as in the related art.

The present invention furthermore relates to an engine control unit for performing the example method according to the present invention for controlling a vehicle drive unit having at least two individual motors. An engine control unit according to the present invention includes an arrangement for adding up individual actual torque values of at least two motors to form a total actual torque, an arrangement for adding up allowable individual torque values of the at least two motors to form an allowable total torque, an arrangement for comparing the total actual torque with the allowable total torque, and an arrangement for initiating an error response if the total actual torque is greater than the allowable total torque.

BRIEF DESCRIPTION OF THE DRAWINGS

The present invention is explained in greater detail with reference to the figures.

DETAILED DESCRIPTION OF EXAMPLE EMBODIMENTS

Figure 1:
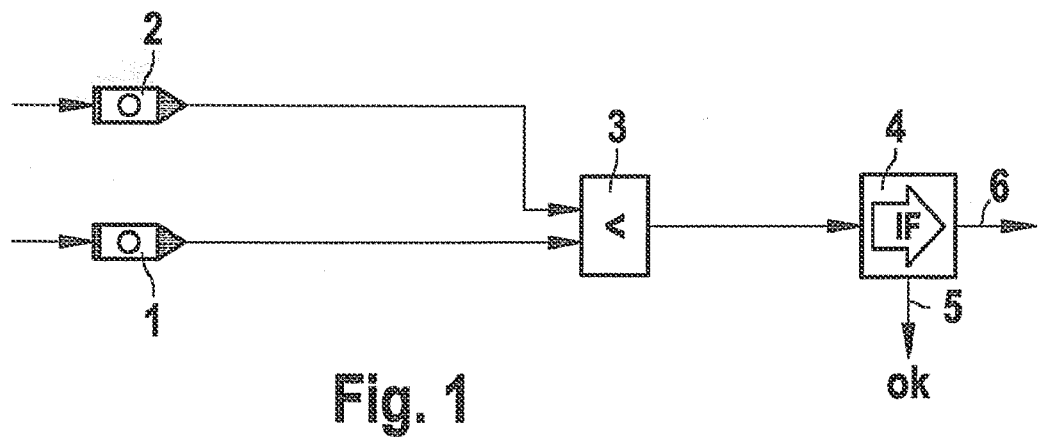
FIG. 1 shows a flow chart for a conventional method for controlling a vehicle motor.

FIG. 1 shows a conventional method in which the torque of a vehicle motor, an internal combustion engine in particular, is monitored.

Conventionally, an actual torque 1 and an allowable torque 2 of the motor is supplied to a comparator 3. Comparator 3 ascertains whether allowable torque 2 is less than actual torque 1 of the motor. Program point 4 checks this. If allowable torque 2 is not less than actual torque 1, correct operation 5 of the engine control unit is assumed. If allowable torque 2 is less than actual torque 1, erroneous operation 6 and thus erroneous torque definition by the control unit is recognized and therefore an error response is initiated.

Figure 2:
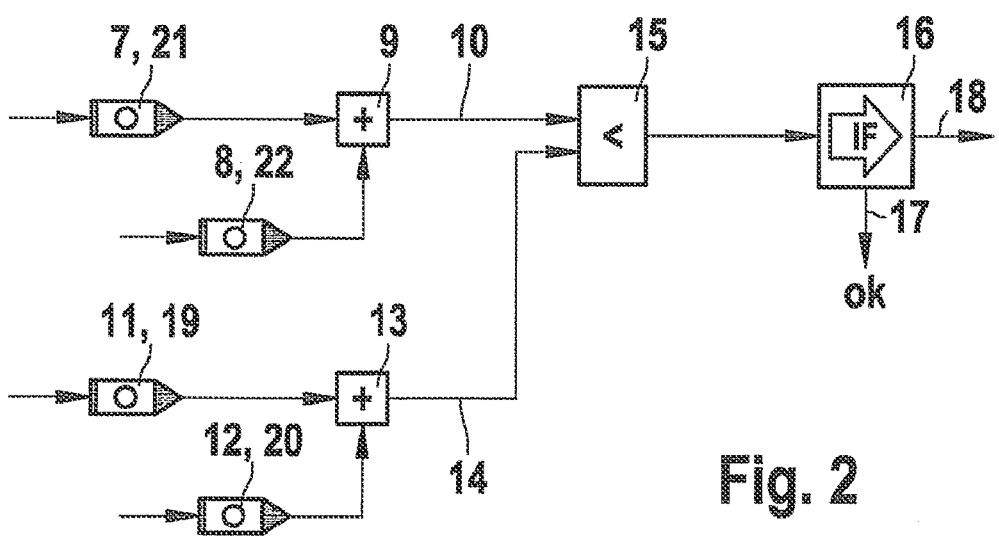
FIG. 2 shows a flow chart for a specific example embodiment of a method according to the present invention for controlling a vehicle drive unit having two motors.

FIG. 2 shows an example method according to the present invention, in which the torque of a vehicle drive unit having two individual motors is continuously monitored.

The two motors have individual torque values 7, 8, respectively. An allowable total torque 10 is calculated from these two allowable individual torques 7, 8 by addition 9 according to the method according to the present invention. Furthermore, the two motors have individual actual torques 11, 12, respectively. According to the present invention, a total actual torque 14 is calculated by addition 13 of the two individual actual torque values 11, 12. A comparator 15 compares whether allowable total torque 10 is less than total actual torque 14. Program point 16 checks this. If allowable torque 10 is not less than total actual torque 14, correct operation 17 of the engine control unit(s) is assumed. If allowable torque 10 is less than the total actual torque, erroneous operation 18 and thus erroneous torque definition by the control unit(s) is recognized and therefore an error response is initiated.

According to a preferred specific embodiment of the present invention, the vehicle drive unit of a vehicle has one internal combustion engine and one electric motor, so that according to FIG. 2 total actual torque 14 is calculated as the sum of an internal combustion engine actual torque value 19 and an electric motor actual torque value 20, and allowable total torque 10 is calculated as the sum of an allowable internal combustion engine torque value 21 and an allowable electric motor torque value 22.

One variant of this preferred specific embodiment of the present invention is that the electric motor generates an individual actual torque which is used for an automatic start or a start-stop-start of the internal combustion engine, electric motor actual torque value 20 being obtained either from state variables of the vehicle or from a control unit of the electric motor via a signal bus. In vehicles having automatic-start or start-stop-start, a start is triggered from the engine control unit without a driver's prompt via the key start. The positive electric torques of the starter represent a torque-enhancing external intervention. The allowable starter torque (allowable electric motor torque value 22), which is formed on level 2 of the motor monitoring concept redundantly to level 1 and is unambiguously a function of the vehicle state, then enters into allowable total torque 10. Electric motor actual torque 20 represents here the torque of the starter and may be modeled in a function of level 2 from the vehicle state (similarly to the procedure used for actual torque 19 of the internal combustion engine) or acquired from the intrinsically secure control unit of the electric motor via a signal bus. In the second case, redundant detection of the starter torque, similar to the redundant signal detection of the external interventions, is necessary. Level 2—totality of the monitoring functions—detects by itself all input signals relevant to the torque comparison. Since the same signals are also detected on level 1—totality of functions effective in the no-defect case—there is redundant detection of signals on level 2. Redundant detection of signals on level 2 is necessary, since it is not ensured that the signal detection on level 1 functions correctly. Examples of redundant signals detected by the bus system are the MSR intervention (torque-enhancing intervention of the brake control unit to the engine control unit), the torque-enhancing transmission intervention or torque requests by a cruise control unit not integrated in the engine controller (CC, ASCD, ACC).

According to another variant of this preferred specific embodiment of the present invention having one internal combustion engine and one electric motor, the electric motor generates an individual actual torque for boosting, electric motor actual torque value 20 being obtained either from state variables of the vehicle or from a control unit of the electric motor via a signal bus. Positive-action torques of the electric motor in driving operation are referred to here as boosting. The allowable boost torque (allowable electric motor torque value 22) is modeled on level 2 of the motor monitoring concept and stored in allowable total torque 10. As in the case of start monitoring for an automatic start or a start-stop-start, both possibilities of simulation on level 2 or signal detection from the control unit of the electric motor exist for the actual torque of electric motor 20.

Another variant of the preferred specific embodiments of the present invention illustrated in FIG. 2, having one electric motor and one internal combustion engine is that the electric motor is a starter which generates a starter torque for the internal combustion engine. In the simplest case, the individual actual torque value of the starter is set to zero when calculating total actual torque 14. This makes further use of the general interface according to the related art possible. However, a starter actual torque (electric motor actual torque value 20) may also be modeled and adjusted to an allowable starter torque (allowable electric motor torque value 22).

Furthermore, in the example method according to the present invention, negative individual actual torque values 11, 12 and negative allowable individual torque values 7, 8 may also be set to zero or taken into account according to their plus or minus sign when calculating total actual torque 14 and allowable total torque 10.

In the first case, only positive torques of the electric motor are included in the allowable electric motor torque and the electric motor actual torque. The advantage results that the torque structure of level 2 of the motor monitoring concept is barely changed compared to the related art, and in particular the handling of the torque losses in generator operation of the electric motor remains unchanged. This, however, includes a potential extension of the torque comparison in the case of negative, but excessive electric motor torques ("less generator torque than expected"), which in the case of malfunction results in impairment of the vehicle response.

In the second case, the disadvantage of the potential extension of the torque comparison is avoided if the quantities "allowable electric motor torque" and "electric motor actual torque" are included in the torque comparison according to their respective plus or minus signs. Both the negative generator torque losses and the positive boost torques are then modeled in the allowable electric motor torque within the allowable torque of level 2 of the motor monitoring concept. The positive or negative actual torque of the generator/motor is included in the electric motor actual torque. This actual torque may be modeled either in a redundant calculation of level 2, or obtained from an external control unit of the generator/motor via a bus. The advantage compared to today's standard of torque monitoring results in that the generator torque is removed from the torque losses which are difficult to estimate and the quality of monitoring is improved in this critical point.

What is claimed is:

1. A method for controlling a vehicle drive unit, the vehicle drive unit including an internal combustion engine and an electric motor, the method comprising:
    calculating a total actual torque as a sum of an internal combustion engine actual torque value and an electric motor actual torque value;
    calculating an allowable total torque as a sum of an allowable internal combustion engine torque value and an allowable electric motor torque value;
    continuously comparing the total actual torque with the allowable total torque; and
    initiating an error response if the comparison establishes that the total actual torque is greater than the allowable total torque.

2. The method as recited in claim 1, wherein the electric motor generates an individual actual torque which is used for an automatic start or a start-stop-start of the internal combustion engine, the electric motor actual torque value being obtained either from state variables of the vehicle or from a control unit of the electric motor via a signal bus.

3. The method as recited in claim 1, wherein the electric motor generates an individual actual torque for boosting the internal combustion engine, the electric motor actual torque value being obtained either from state variables of the vehicle or from a control unit of the electric motor via a signal bus.

4. The method as recited in claim 1 wherein the electric motor is a starter which generates a starter torque for the internal combustion engine.

5. The method as recited in claim 4, wherein the individual actual torque value of the starter is set to zero when calculating the total actual torque.

6. The method as recited in claim 1, wherein at least one individual actual torque value is ascertained by at least one of the following methods: back-calculating from measured air quantity values, from measured values of a lambda sensor, from a measured ignition angle, from injection parameters selected from fuel pressure, injector opening time, and injector closing time, via converting current, voltage, and rotational speed of an electric motor or via at least one torque sensor on a crankshaft.

7. The method as recited in claim 1, wherein at least one allowable individual torque value is calculated taking into account at least one quantity selected from: an accelerator pedal signal, a torque generated by a driver assistance system, a torque generated by an external intervention, and a torque loss.

8. The method as recited in claim 1, wherein negative individual actual torque values and negative allowable individual torque values are set to zero or are taken into account according to their plus or minus sign when calculating total actual torque and the allowable total torque.

9. The method as recited in claim 1, wherein negative individual actual torque values and negative allowable individual torque values are disregarded when calculating the total actual torque and the allowable total torque.

10. The method as recited in claim 1, wherein negative individual actual torque values and negative allowable individual torque values are included when calculating the total actual torque and the allowable total torque.

11. A motor control unit, comprising:
an arrangement adapted to add up individual actual torque values of an internal combustion engine and an electric motor to form a total actual torque;
an arrangement adapted to add up allowable individual torque values of the internal combustion engine and the electric motor to form an allowable total torque;
a comparator adapted to compare the total actual torque with the allowable total torque; and
an arrangement adapted to initiate an error response if the total actual torque is greater than the allowable total torque.

\* \* \* \* \*